UNITED STATES PATENT OFFICE.

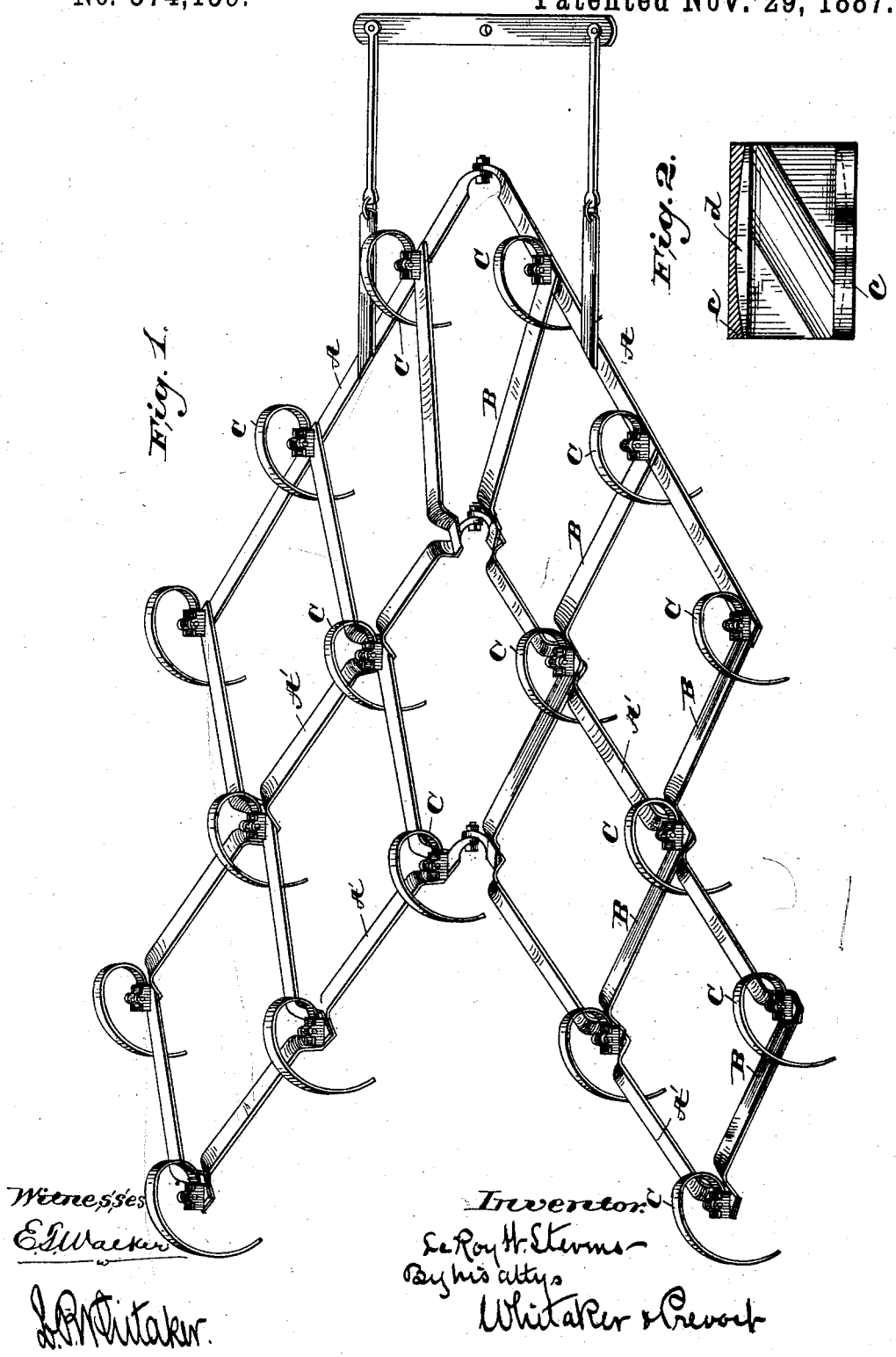

LE ROY W. STEVENS, OF AUBURN, NEW YORK.

HARROW.

SPECIFICATION forming part of Letters Patent No. 374,159, dated November 29, 1887.

Application filed October 14, 1887. Serial No. 252,369. (No model.)

*To all whom it may concern:*

Be it known that I, LE ROY W. STEVENS, a citizen of the United States, residing at Auburn, in the county of Cayuga and State of New York, have invented certain new and useful Improvements in Harrows; and I do hereby declare the following to be a full, clear, and exact description of the invention, such as will enable others skilled in the art to which it appertains to make and use the same.

My invention is an improvement in harrows; and it consists in a combination of parts whereby certain desirable results are obtained. In the first harrowing of plowed land, if the harrow-frame is composed of straight bars, such bars come in contact with the high parts of the uneven surface and assist in bringing them to a level; but harrows having frames composed of straight bars are liable to clog, the bars setting so near the ground that a sufficient clearance is not provided for loose materials on the ground. By my construction I provide adequate clearance for loose materials and prevent the clogging of the harrow, and at the same time I secure the desired action of the harrow in leveling the ground.

Figure 1 is a perspective view of one form of harrow with my present improvement embodied therein. Fig. 2 is a part sectional view of a form of tooth-clip designed by me.

In the drawings I have shown a harrow having its frame made in two parts hinged together; but my invention may be applied to harrows with other forms of frame.

A A are the first or front draft-bars. A' A' are the draft-bars in rear of the same. These bars, with the intersecting cross-bars B B, constitute the harrow-frame. The front draft-bars, A A, are straight throughout the operative portions of their length, while the bars A' A' are provided between the cross-bars with arched or upwardly-deflected portions, and the cross-bars B B are also provided with upwardly arched or deflected portions between the draft-bars. The said cross-bars have preferably the highest parts of their upwardly-deflected portions near the rear cross-bar, as shown in the drawings, so that the clearance-space beneath them will increase from front to rear. The teeth C, which in this case are a well-known form of spring harrow-teeth, are attached to the frame at the points of intersection of the draft and cross bars. The upwardly-deflected portions of the bars adjacent to the teeth form guards for the teeth and prevent them from striking against large stones or immovable obstacles in the ground.

The draft and cross bars may be of flat bars, or they may be corrugated or provided with a curved wearing-surface, as may be preferred. Instead of making one of the draft-bars of a harrow, with a row of teeth attached thereto, a leveling-bar, I may make the tooth-supporting part of the frame entirely of arched bars and provide a leveling-bar without teeth in front of this main body of the frame.

In operating a harrow it is well understood that there is little or no liability of clogging taking place before the front draft-bar, and by providing clearance-spaces in rear thereof I am able to construct a harrow which will not clog and which will yet have the desired effect in leveling the ground.

In Fig. 2 I have shown a modification of the form of tooth-clip shown in my application No. 244,777, filed July 19, 1887. Instead of making the walls curving in the center, I make the walls *c c'* of the clip straight, but make the groove engaging the edges of the tooth deeper in the center, as shown at *d*, and employ a central connecting-bolt. I may, however, make the groove of a reverse form deepest at the ends and employ two connecting-bolts, one at each end, and get the same result. In these constructions the walls will yield before the tooth will be firmly grasped along the whole extent of the side walls, and the constant pressure upon the nut or nuts of the connecting-bolts serves to keep them from becoming loose.

I do not desire to be limited to my exact construction, as the same may be considerably varied without departing from the spirit of my invention.

What I claim, and desire to secure by Letters Patent, is—

1. The combination, with a harrow-frame consisting of intersecting draft and cross bars, the said draft-bars being provided with arched or upwardly-deflected portions, of a leveling-bar in front of said arched or upwardly-deflected bars, substantially as described.

2. A harrow-frame composed of intersecting draft and cross bars, the front draft-bar being straight throughout the operative portion of its length and the draft-bars in rear thereof being provided with arched or upwardly-deflected portions, substantially as described.

3. A harrow-frame composed of intersecting draft and cross bars, the first or front bar or bars being straight throughout the operative portion of their length, the draft-bars in rear thereof and the cross-bars being provided with arched or upwardly-deflected portions, substantially as described.

4. A harrow-tooth clip having vertically-disposed walls grooved to receive the edges of the tooth, the bottom of said groove diverging from a straight line, and an adjustable connection for said walls, substantially as described.

5. A harrow-tooth clip having vertically-disposed walls grooved to receive the edges of the tooth, the bottom of said groove being bowed outwardly at the center of the clip, and a central connecting-bolt, substantially as described.

In testimony whereof I affix my signature in presence of two witnesses.

LE ROY W. STEVENS.

Witnesses:
  W. A. NYE,
  C. B. QUICK.